United States Patent

Watson

[11] Patent Number: 5,070,487
[45] Date of Patent: Dec. 3, 1991

[54] MAGNETO-OPTIC MEDIA RECORDING SYSTEM INCLUDING A DIRECTED MAGNETIC BIAS FLUX

[75] Inventor: Edwin G. Watson, Voorhees, N.J.

[73] Assignee: General Electric Company, Camden, N.J.

[21] Appl. No.: 473,016

[22] Filed: Jan. 31, 1990

[51] Int. Cl.⁵ .................. G11B 11/14; G11B 5/127
[52] U.S. Cl. ........................... 369/13; 360/84; 360/114; 360/59
[58] Field of Search .............. 369/13, 111; 360/59, 360/114, 130.23, 130.24, 84, 64, 114

[56] References Cited

U.S. PATENT DOCUMENTS

| | | | |
|---|---|---|---|
| 3,453,646 | 7/1969 | Speliotis et al. | 346/74 |
| 3,626,114 | 3/1969 | Lewicki et al. | 179/100.2 |
| 3,775,570 | 11/1973 | Lewicki et al. | 179/100.2 |
| 3,778,791 | 12/1973 | Lewicki et al. | 340/174.1 |
| 3,969,765 | 7/1976 | Roos | 360/59 |
| 4,340,914 | 7/1982 | Hanaoka | 360/59 |
| 4,525,828 | 6/1985 | Higashiyama et al. | 369/13 X |
| 4,594,699 | 6/1986 | Browder | 369/13 |
| 4,642,711 | 2/1987 | Yunoki et al. | 360/84 |
| 4,701,894 | 10/1987 | Watson | 369/13 |
| 4,816,950 | 3/1989 | Heinz et al. | 360/84 X |
| 4,843,600 | 6/1989 | Miyajima et al. | 369/13 |
| 4,884,262 | 11/1989 | Larsen | 369/147 X |

Primary Examiner—Stuart S. Levy
Assistant Examiner—Joseph A. Rhoa
Attorney, Agent, or Firm—Raymond E. Smiley

[57] ABSTRACT

A magneto-optic recording system includes a scanning wheel head around which is wound a magneto-optic recording tape in spiral fashion. A first magnetic pole piece surrounds the tape outward of the wheel. A second pole piece extends between an aperture on the wheel opposite the tape to a point proximate the first pole piece and is coupled to source of magnetic flux. A light source is directed from inside the wheel toward the aperture and thus to the tape. The wheel, second pole piece, flux source and light source rotate together relative to the tape to direct a magnetic field to successive points of incidence on the tape.

5 Claims, 2 Drawing Sheets

MAGNETO-OPTIC MEDIA RECORDING SYSTEM INCLUDING A DIRECTED MAGNETIC BIAS FLUX

BACKGROUND OF THE INVENTION

1. Field of Invention

This invention relates to an erasable magneto-optic media recording system which provides a magnetic biasing flux at a point of optical incidence on the media and, more particularly, to such a system which provides such magnetic biasing flux without interfering with the path required for the travel of the media.

2. Description of the Prior Art

Magneto-optic media is known which has information recorded thereon or read therefrom by means of a focussed spot of light utilized in conjunction with a directed magnetic bias. In one such form the media is magneto-optic tape which is recorded upon or read from by means of a helical scanning optical head in known fashion. In such a system, when recording or erasing, a light beam is focussed, by suitable beam forming means, onto successive spots on the tape to soften the tape which then, by means of a magnetic bias of one polarity or another, deforms the surface layer of the tape in a desired fashion to effect the process of recording or erasing data. The change in the surface optical reflectance characteristics is typically recognized by a differential detection scheme using the Kerr effect and thus is used to read the data.

A problem arises in providing the desired magnetic bias at the point of incidence of the light beam on the tape in that a magnetic bias is required at all locations of the scan of the tape by the beam and the relative velocities of the scanner and tape are different. This means that either a scanning field must follow the optical scan or the magnetic field must be simultaneously present at all locations. Supplying a biasing field solely from the optics side of the tape is unpractical because of interference with electro-optical elements of the beam forming means and excessive power is required for providing the field over a long air gap.

A device on the side of the tape opposite that being recorded upon and which rotates with the scanning optical head will interfere with the path that the tape requires for feeding and exiting the scanner wheel of the scanning optical head.

SUMMARY OF THE INVENTION

In connection with a recording media having first and second opposed surfaces and in accordance with a preferred embodiment of the present invention, a system for providing a magnetic flux circuit from the first surface of the recording media to the second surface thereof for directing a magnetic flux successively to different locations on the first surface, comprises in combination, first and second members each of magnetic material, means for translating the second member and means for providing the magnetic flux.

The first member is located in proximity to the second surface of the media simultaneously opposite the different locations on the first surface. The second member has a first terminus in proximity to the first surface of the media at a single location thereof and a second terminus in proximity to said first member. The means for translating the second member is able to translate it relative to the media and first member so that the first terminus of the second member is successively relatively translated to the different locations on the media first surface. The means providing a source of said magnetic flux is coupled to the second member for relative translation therewith. Thus, the magnetic flux is successively directed to the different locations on the media.

DETAILED DESCRIPTION

Figure 1:
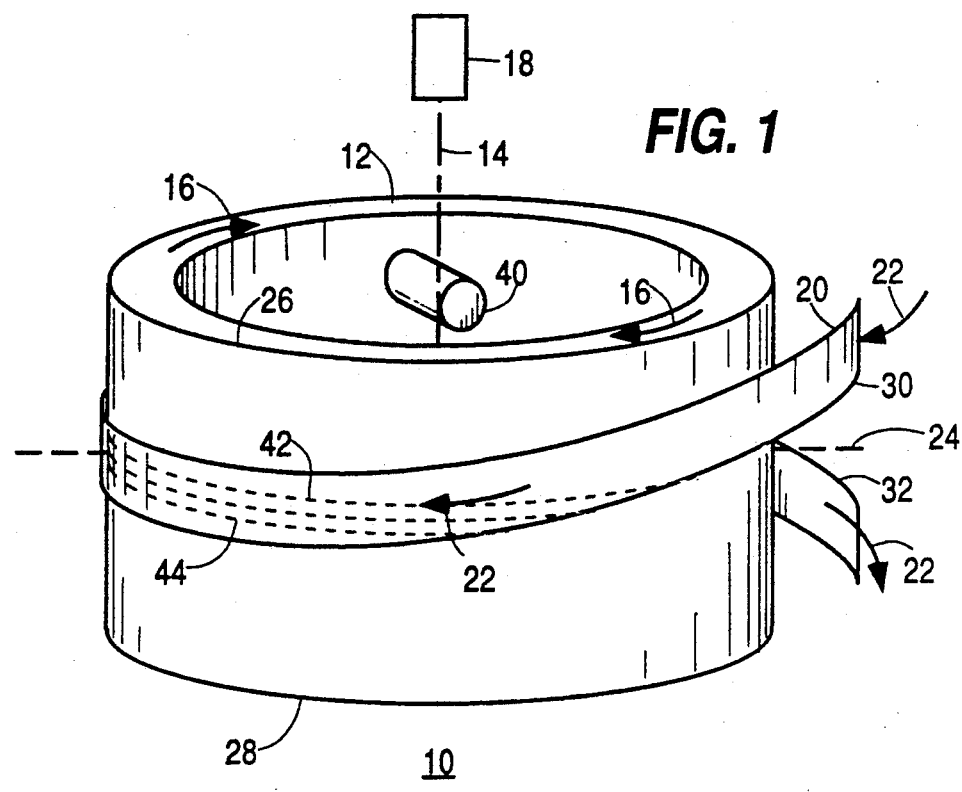
FIG. 1 illustrates a helical scan optical tape system in mechanical schematic perspective form.

In FIG. 1 a helical scan optical tape system 10 comprises, in its simplest form, a cylindrical hollow scanning wheel 12 of nonmagnetic material rotatable about a central axis 14 in the direction of arrows 16 by means 18 such as a servo motor. A magneto-optic media 20, such as magneto-optic tape, is wrapped in helical fashion around scanning wheel 12. An exemplary media is a tape comprising a 0.001–0.002 inch thick mylar base coated with an optically absorptive magnetic coating similar to that used on a magneto-optic disk. The tape is moved onto and off of scanning wheel 12 by means not shown and moves in the direction indicated by arrows 22. Horizontal center line 24 of wheel 12 is positioned vertically half-way between top edge 26 of scanning wheel 12 and bottom edge 28 of the scanning wheel all as illustrated in FIG. 1. Tape 20 rides nominally along center line 24 but first contacts wheel 12 such that its lower edge 30 is above center line 24 and leaves contact with wheel 12 such that its upper edge 32 is below center line 24.

An optical source 40 such as a laser light, or other source operating at a wavelength to correspond with the absorptive properties of the media 20, is positioned inside scanning wheel 12 and arranged to rotate with it about axis 14. By means of optics (not shown in FIG. 1), optical source 40 projects a scanning beam indicated as a dashed line 42 onto tape 20 through an appropriate opening (not shown) in scanning wheel 12. As is known to those skilled in the art of helical scanning, tape 20 moves at a relatively slow rate while scanning wheel 12 and thus optical source 40 move at a relatively faster rate. Typically the tape 20 rides slightly off of wheel 12 supported on a cushion of air from a source not shown. The result is that helical information scan lines are created on tape 20 as indicated by exemplary dashed lines 44.

Figure 2:
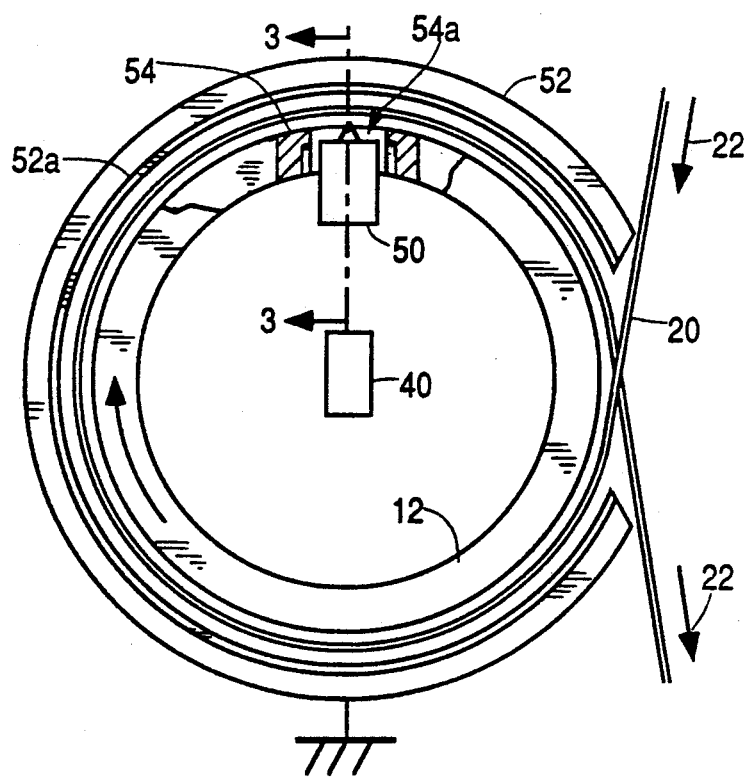
FIG. 2 is a top view of a helical scan optical tape system in accordance with a preferred embodiment of the present invention, but with certain components missing for purposes of clarity.

FIG. 2, to which attention is now directed, is a top view of FIG. 1 with additional components illustrated. Thus, in FIG. 2 the optics 50 associated with optical source 40 is illustrated as is a ring 52, made of ferromagnetic material, which generally surrounds scanning wheel 12 but has an opening where tape 20 passes into and out of its proximate relation with scanning wheel 12. Ring 52 is part of a magnetic flux path structure to be described in more detail in connection with FIG. 3. Also part of that flux path structure is a ring 54, made of ferromagnetic material and positioned in an opening in wheel 12 centered in line with source 40 and optics 50 and having a central aperture 54a permitting illumination of tape 20.

Figure 3:
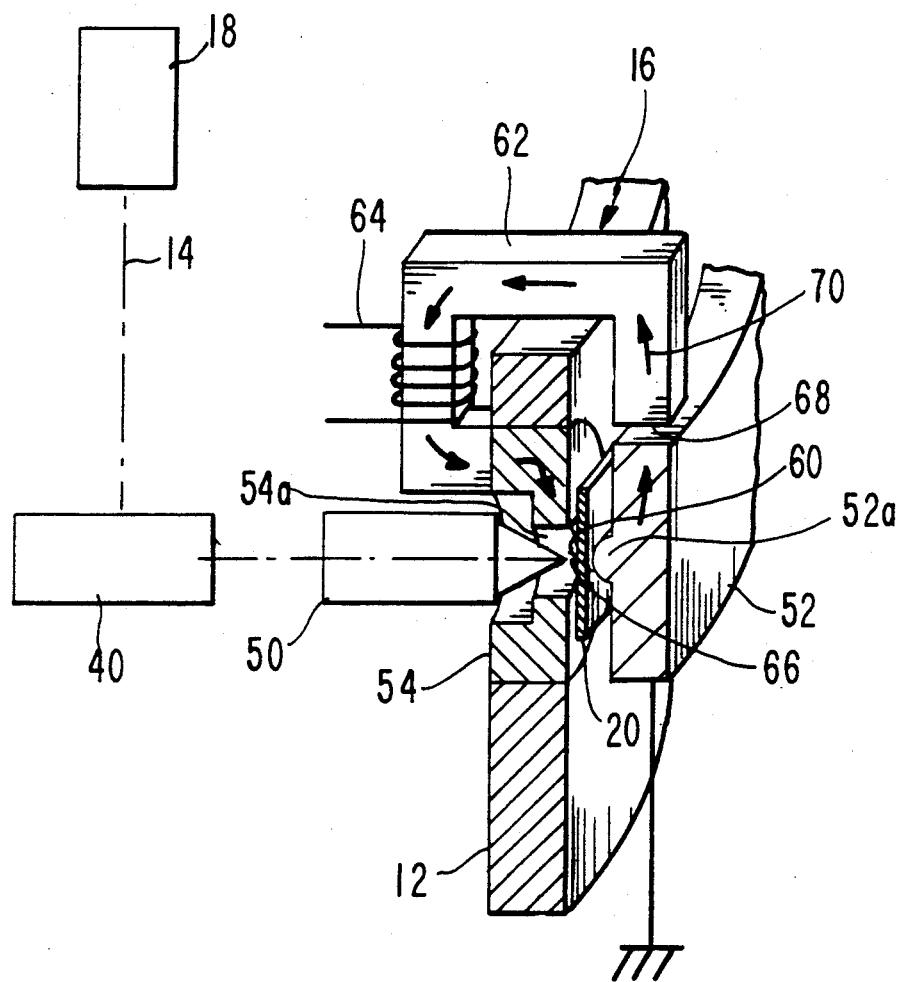
FIG. 3 is a cross-section along lines 3—3 of FIG. 2 illustrating various components of a helical scan optical tape system in accordance with a preferred embodiment of the present invention.

FIG. 3, to which attention is now directed, is a cross-section of FIG. 2 along lines 3—3 thereof but showing additional parts omitted from FIG. 2 for purposes of drawing clarity. In FIG. 3, call-out 60 marks the point of incidence of the optical illumination of tape 20 by optics 50 and illumination source 40. Ring 52, as better illustrated in FIG. 3, includes a relatively narrow section 52a extending the length of ring 52 in proximity to tape 20 to better direct the flux in the vicinity of point of incidence 60. Ring 54, as better illustrated in FIG. 3, is imbedded in scanner wheel 12. A second ferromagnetic more or less C-shaped pole piece 62 is connected to ring 54 at a position inside of wheel 12 and extends in proximity to but not touching ring 52. A coil 64 is wound around pole piece 62 to provide an appropriate magnetic field in the vicinity of point of incidence 60 of the optical beam on tape 20. Thus, it will be understood that the flux path is through pole piece 62, through ring-shaped pole piece 54 through the gap 66 between pole piece 54 and pole piece 52 and through gap 68 back to pole piece 62, all as indicated by various arrows such as 70.

It will be understood that coil 64 and pole piece 62 are parts which are not illustrated in FIG. 2 for drawing clarity in that figure. It should also be understood from the description thus far that scanning wheel 12, pole pieces 54 and 62, coil 64, illumination source 40, and optics 50 all rotate together by means of drive source 18 in the direction indicated by arrow 16 at a relatively high speed while tape 20 moves in the same direction at a relatively slow speed and pole piece 52 is stationary.

The magnetic flux follows the described path because it is the path of least resistance. A magnetic flux will be present in that portion of the fixed pole piece 52, and in the gap 66 at the point of incidence 60 of the magnetic field on tape 20 and thus, only momentarily on a particular region of the tape, due to the scanning effect. With the arrangement illustrated in FIG. 3, the total area through which the flux travels is reduced, relative to the full circumference of the scanner to a small area local to the point of incidence on tape 20 at call-out 66.

Operation of the system of FIGS. 2 and 3 is as follows. Tape 20 moves relatively slowly past scanning wheel 12 as indicated by arrows 22. Wheel 12, carrying with it optical source 40, optics 50 and components of a magnetic flux circuit comprising the combination of magnetic members 54 and 62 and coil 64, rotates about axis 14 (FIG. 1) at a faster rate. Source 40 is modulated to soften a layer on tape 20 nearer to the source at whatever spots along line 42 the beam from source 40 and more particularly optics 50 is directed when the source is turned on. The purpose of the flux circuit comprising components 52, 54, 62 and 64 is to direct flux at the tape 20 at the point of incidence 66 where the beam strikes the tape 20 to provide a magnetic bias to thus alter the optical reflectance characteristic of the tape in one way or another depending on the polarity of the coil 64 which is dependant on whether the tape is being written upon or erased. As the scanning wheel rotates, successive spots are written or erased on the tape and thus written or erased tape exits through the opening in magnetic pole piece 52, which is stationery relative to the tape 20, wheel 12 and other moving components.

Eddy current forces, which resist the rotation of the scanner assembly components 12, 40, 54, 62 and 64, will be generated. However, these forces will be related to the area of flux between the fixed element 52 and rotating elements and can be easily compensated for by the scanner drive servomechanism 18. Flux reversal or modulation to the direction opposite that shown by arrows such as 70 is effected by applying a current to coil 64 in an opposite direction of that which produces the flux in the direction illustrated by arrows 70. It will also be understood that electromagnet 64 may be replaced by a permanent magnet (not shown).

With a permanent magnet in place of electromagnet 64, controllability of flux direction and intensity is obtained by a mechanism which rotates, slides, or otherwise repositions the poles of the magnet to reverse or nullify flux in the flux path circuit above described.

What is claimed is:

1. In connection with a recording media in the form of an elongated flexible tape having first and second opposed surfaces, a system for providing a magnetic flux path from said first surface of said recording media to said second surface thereof for directing a magnetic field successively to different locations on said first surface, said system comprising in combination;
   a cylindrical hollow nonmagnetic member around which a portion of said tape is wound in spiral fashion with said first surface being closer to said cylinder than is said second surface;
   a first member of a magnetic material located in proximity to said second surface of said media comprising means in the shape of a semicircle surrounding at least a part of the circumference of said cylindrical member and said portion of said tape; and
   a second member of magnetic material having a first terminus in proximity to said first surface of said media at a single location thereof and a second terminus in proximity to said first member, said second member comprising a generally ring-shaped member of magnetic material having a generally central aperture therein and secured in an opening in said cylindrical member opposite said tape and said first member and further comprising a member of magnetic material which extends between said first member and said generally ring-shaped member;
   a source of optical energy and means for directing the optical energy through said aperture in said generally ring-shaped member and onto the portion of tape located opposite said aperture and said ring-shaped member;
   means for translating said second member relative to said media and first member so that said first terminus of said second member is successively relatively translated to said different locations on said media first surface; and
   means providing a source of said magnetic flux and coupled to said second member for motion therewith;
   whereby said magnetic field is successively directed to said different locations.

2. The combination as set forth in claim 1 wherein said means for translating said second member comprises means for simultaneously rotating said cylindrical member, said ring-shaped member, said member secured to said ring-shaped member, and said means providing a source of magnetic flux all together about a central axis of said cylindrical member such that said extending member travels in proximity to said first member over its length so as to maintain a continuous flux circuit through said tape.

3. A magneto-optic tape recording system comprising, in combination:
- a rotatable hollow nonmagnetic scanning wheel head having a central axis and adapted for accepting, on its outer surface, a magneto-optic tape;
- a first magnetic pole piece in the form of a semicircle positioned circumferentially around said head such as to lie in a plane normal to said central axis, said tape, if present, passing through said plane;
- a ring of magnetic material positioned in an aperture in said head in said plane, said ring having an aperture;
- a second magnetic pole piece having a first terminus positioned proximate to said first magnetic pole piece and a second terminus secured to said ring at a point inside said head;
- a source of magnetic flux coupled to said second magnetic pole piece;
- means for rotating, as a unit, about said central axis, relative to said first magnetic pole piece, said head, ring, second magnetic pole piece, and flux source for maintaining said first terminus in proximity to said first magnetic pole piece; and
- means for providing an illumination beam directed through said aperture in said ring, said illumination means rotating with said head, whereby a continuous magnetic flux circuit is maintained from said first magnetic pole piece through said second magnetic pole piece and said ring back to said first magnetic pole piece.

4. The combination as set forth in claim 3 further including a magneto-optic tape, a portion of which is wound spirally around said head and inside said first member said portion being in said plane.

5. The combination as set forth in claim 4 wherein said beam is modulated to selectively heat and thereby change the reflectance properties of said tape at selected spots thereon.

* * * * *